United States Patent
Sieting

(10) Patent No.: US 11,541,821 B2
(45) Date of Patent: Jan. 3, 2023

(54) DRYING RACK

(71) Applicant: Faurecia Automotive Seating, LLC, Auburn Hills, MI (US)

(72) Inventor: Todd Sieting, Clarkston, MI (US)

(73) Assignee: Faurecia Automotive Seating, LLC, Auburn Hills, MI (US)

(*) Notice: Subject to any disclaimer, the term of this patent is extended or adjusted under 35 U.S.C. 154(b) by 371 days.

(21) Appl. No.: 16/808,466

(22) Filed: Mar. 4, 2020

(65) Prior Publication Data

US 2021/0276491 A1 Sep. 9, 2021

(51) Int. Cl.
*B60N 2/56* (2006.01)
*B60R 7/10* (2006.01)
*A47C 7/62* (2006.01)
*B60N 3/00* (2006.01)
*F26B 3/00* (2006.01)
*A47C 7/74* (2006.01)

(52) U.S. Cl.
CPC ............... *B60R 7/10* (2013.01); *A47C 7/622* (2018.08); *B60N 2/5621* (2013.01); *B60N 2/5635* (2013.01); *B60N 2/5657* (2013.01); *B60N 3/00* (2013.01); *F26B 3/00* (2013.01); *A47C 7/74* (2013.01)

(58) Field of Classification Search
CPC .. B60N 2/5657; B60N 2/5635; B60N 2/5621; A47C 7/74; A47C 7/742; A47C 7/748; B60R 7/10
See application file for complete search history.

(56) References Cited

U.S. PATENT DOCUMENTS

| 7,043,854 | B2 | 5/2006 | Peet | |
| 2019/0142172 | A1* | 5/2019 | Toda | B60N 2/5607 |
| | | | | 297/180.13 |
| 2019/0335907 | A1* | 11/2019 | Tanaka | A47C 7/748 |

FOREIGN PATENT DOCUMENTS

| CN | 109480675 A | 3/2019 |
| EP | 1834564 A2 | 9/2007 |
| KR | 200276293 | 5/2002 |

OTHER PUBLICATIONS

Manledio Portable Electric Shoe Glove Boot Dryer and Warmer with Folding and Drying Rack, available at https://www.amazon.com/Manledio-Portable-Electric-Folding-Adjustable/dp/B06XCSGKXK/ref=cm_cr_arp_d_product_top?e=UTF8, at leat available by Jul. 3, 2017, 8 pages.

* cited by examiner

Primary Examiner — Syed A Islam

(74) Attorney, Agent, or Firm — Barnes & Thornburg LLP

(57) ABSTRACT

An occupant support for a vehicle includes a seat bottom and a seat back. At least one of the seat bottom and the seat back includes an integrated article-drying system configured to dry articles.

20 Claims, 4 Drawing Sheets

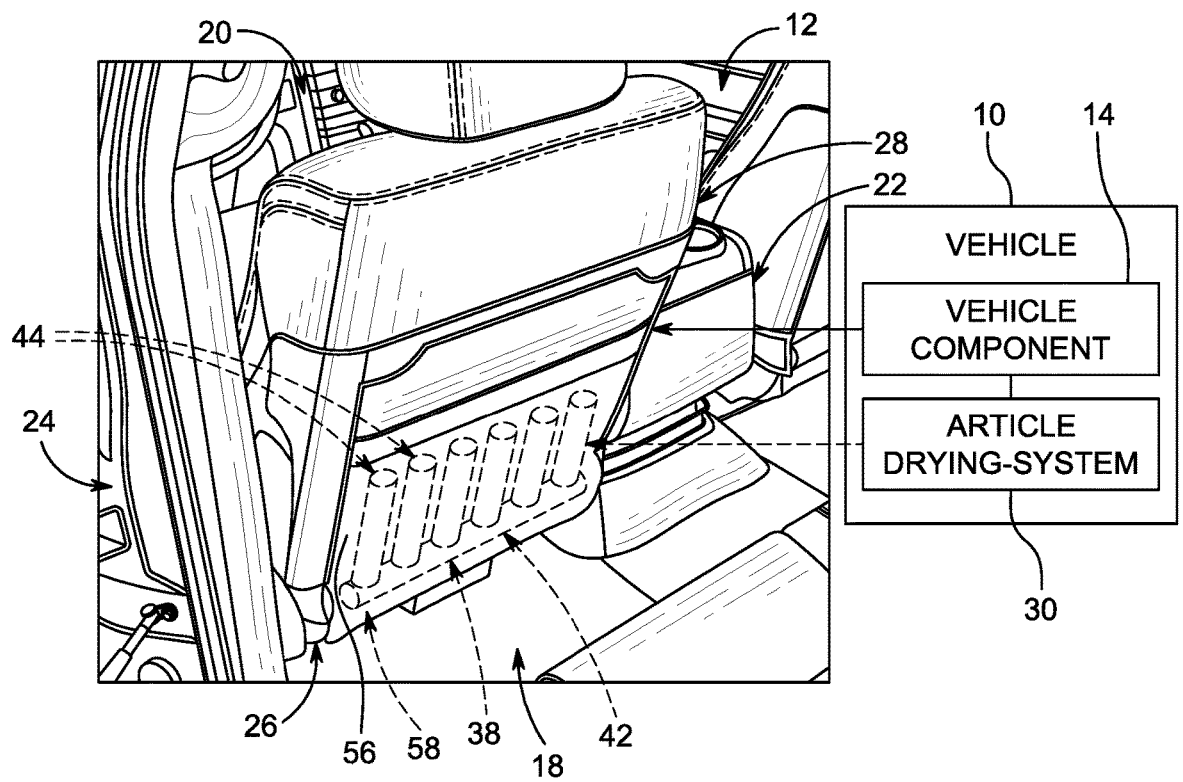
FIG. 1
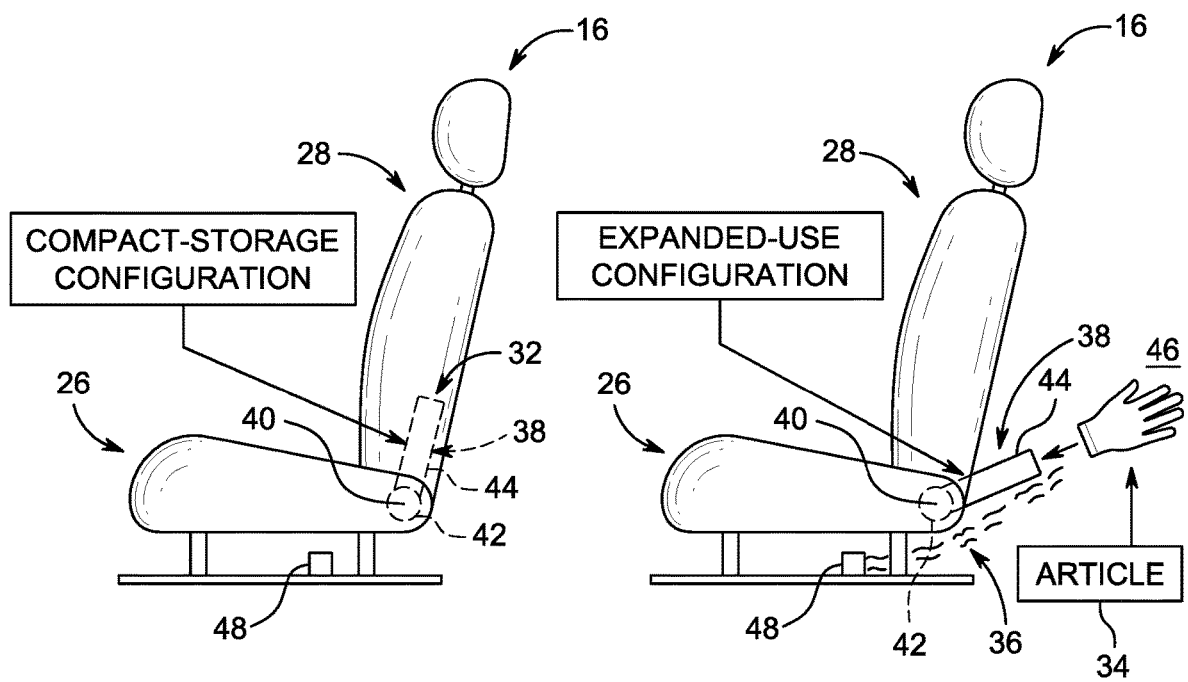
FIG. 2
FIG. 3

DRYING RACK

BACKGROUND

The present disclosure relates to vehicles, and particularly to vehicles having a cabin that houses multiple vehicle components. More particularly, the present disclosure relates to vehicle components with one or more devices used for providing utility to an occupant of the cabin.

SUMMARY

According to the present disclosure, a vehicle includes a cabin, an occupant support arranged in the cabin, and an article-drying system coupled to the occupant support.

In illustrative embodiments, the article-drying system is fixed permanently to the occupant support and is configured to move between a storage configuration and a use configuration. In the storage configuration, at least a portion of the article-drying system is stowed away within a space defined by the occupant support. In the use configuration, at least a portion of the article-drying system extends out of the space to receive an article, such as an article of clothing, for example. The article-drying system is configured to provide heat transfer to the article to dry the article.

In illustrative embodiments, the article-drying system includes an article-positioning system that positions the article in line with a stream of drying fluid to transfer heat to the article when the article-drying system is in the use configuration. The article-positioning system is mounted to the occupant support for pivotable movement about an axis to change the article-drying system from the storage configuration to the use configuration.

In illustrative embodiments, the article-positioning system includes a carrier member and at least one branch member that extends away from the carrier member. The carrier member is mounted to the occupant support for movement relative to the occupant support so that the article-drying system can change between the storage configuration and the use configuration. The branch member protrudes out of the space formed in the occupant support to receive the article in the use configuration.

In illustrative embodiments, heat may be provided by a stream of drying fluid that is discharged from a vent included in the vehicle while the article-drying system positions the article in line with the stream of drying fluid. In other embodiments, the stream of drying fluid may be conveyed through ducts defined by the article-positioning system from a source duct and discharged through openings in the branch members onto the article.

In illustrative embodiments, the article-drying system further includes a heating-system mount and a heat-control system. The heating-system mount is configured to mount the article-positioning system to the occupant support and conceals the article-positioning system from view in the storage configuration. The heat-control system is configured to regulate heat transfer in response to the arrangement of the article-positioning system relative to the vehicle component.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of an occupant support arranged within a cabin of a vehicle with an integrated article-drying system coupled to the occupant support for movement with the occupant support and relative to the occupant support between a storage configuration, as shown in FIG. 2, and a use configuration, as shown in FIG. 3, where at least a portion of the article-drying system extends away from the occupant support to receive an article and to position the article in proximity to a stream of drying fluid to dry the article;

FIG. 2 is a side elevation view of the occupant support from FIG. 1 showing the article-drying system in the storage configuration in which the article-drying system is stowed away within a space formed in the occupant support system;

FIG. 3 is a view similar to FIG. 2 showing the article-drying system in the use configuration in which a branch member extends away from the occupant support into a rear-row occupant region with an article being installed on the branch member to position the article in a stream of drying fluid to dry the article;

DETAILED DESCRIPTION

Figure 4:
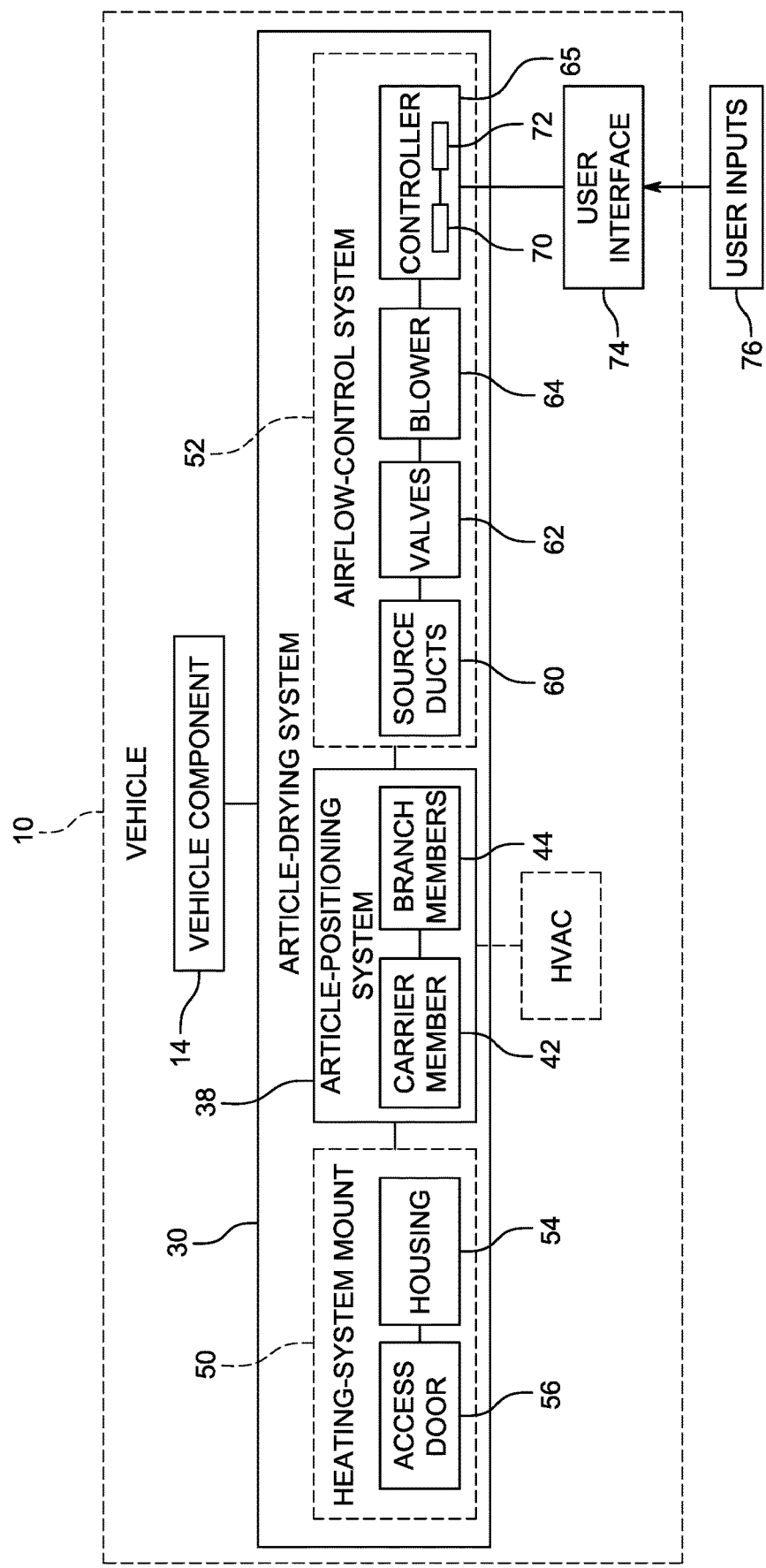
FIG. 4 is a diagrammatic view of the vehicle showing that the article-drying system includes an article-positioning system that supports articles in proximity to the stream or drying fluid, a heating-system mount that couples the article-positioning system to the occupant support and conceals the article positioning system from view in the storage configuration, and an airflow control system configured to regulate application of the stream of drying fluid on the article.

An occupant support 16 is illustratively shown in FIG. 1 and is arranged within a cabin 12 of a vehicle 10. The occupant support 16 includes an article-drying system 30 that is configured to receive articles, for example, wet gloves of an occupant, and dry them quickly and efficiently. As a result, the articles are retained in place and kept organized during use of the vehicle 10 while drying occurs.

The occupant support 16 further includes a seat bottom 26 and a seat back 28 coupled to the seat bottom 26. The seat bottom 26 extends over a vehicle floor 18. The seat back 28 is coupled to the seat bottom 26 and extends upwardly away from the vehicle floor 18 and seat bottom 26. The article-drying system 30 may be coupled to the seat bottom 26, as shown in FIGS. 1-5, or seat back 28, as shown in FIGS. 6 and 7.

The vehicle 10 includes a plurality of vehicle components 14 arranged in the cabin 12 as shown in FIG. 1. The occupant support 16 is included among the plurality of vehicle components 14. In addition to the occupant support 16, the plurality of vehicle components 14 include, for example, a vehicle floor 18, a front dashboard 20, a center console 22, a door 24, or another vehicle component within the cabin 12. In some embodiments the article-drying system 30 may be integrated into any vehicle component 14 such as the vehicle components described above.

In the illustrative embodiment shown in FIGS. 1-5, the article-drying system 30 is coupled to the seat bottom 26 for movement with the seat bottom 26. The article-drying system 30 is configured to move from a storage configuration, as shown in FIG. 2, to a use configuration, as shown in FIG. 3. In the storage configuration, the article-drying system 30 may rest against the occupant support 16 and may be stowed away in a space 32 defined in part or in whole by at least one of the seat bottom 26 and the seat back 28. In the use configuration, at least a portion of the article-drying system 30 extends out of the space 32 to receive an article 34, such as a glove, for example. The space 32 is shown as extending through a portion of the seat bottom 26 and a portion of the seat back 28 in the illustrative embodiment, although, in other embodiments, the space 32 may be solely within the seat bottom 26 or solely within the seat back 28. In some embodiments, the space 32 is formed within the occupant support 16. In other embodiments, the space 32 is at least partially defined by an external surface of the occupant support 16 such that the space is bounded partially by the occupant support and open to the cabin 12 of the vehicle 10.

The article-drying system 30 is configured to hold the article 34 above the floor 18 for drying as shown in FIG. 3. The article-drying system 30 includes an article-positioning system 38 that positions the article 34 in line with the stream of drying fluid 36 to expedite drying of the article 34 as suggested in FIG. 3. The article-positioning system 38 is mounted to the occupant support 16 for pivotable movement about a pivot axis 40 to move from a stowed position, as shown in FIG. 2, to an extended position (also called a use position), as shown in FIG. 3, to change the article-drying system 30 from the storage configuration to the use configuration.

Figure 7:
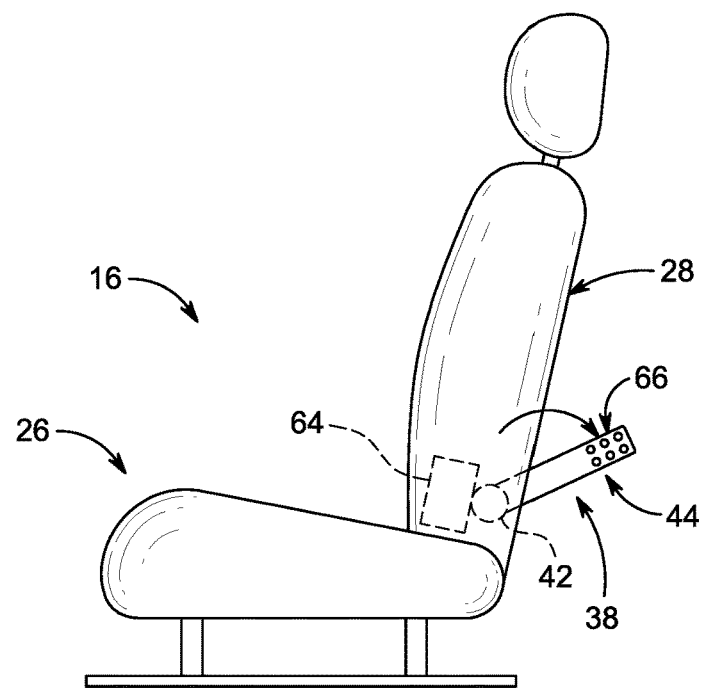
FIG. 7 is side elevation view of another embodiment of an occupant support with an article-drying system coupled to a seat back of the occupant support for movement between a storage configuration, in which the article-drying system is arranged within a space in the seat back, and a use configuration, in which at least a portion of the article-drying system extends out of the space away from the seat back.
Figure 8:
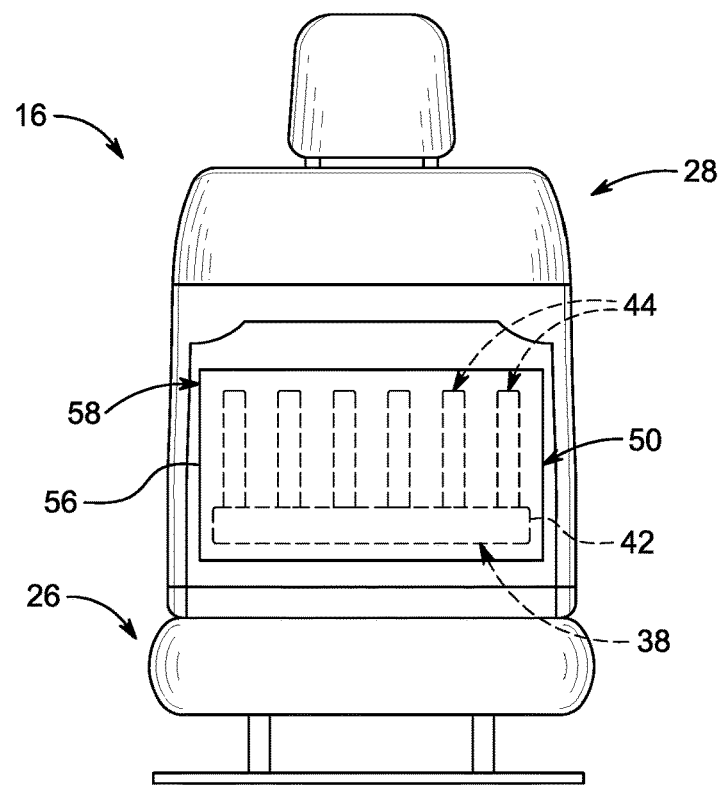
FIG. 8 is a rear elevation view of the occupant support of FIG. 7 showing that the article-drying system includes a carrier member and a plurality of branch members coupled to the carrier member.

The article-positioning system 38 includes a carrier member 42 and at least one branch member 44 that extends away from the carrier member 42 as shown in FIGS. 2-4. The carrier member 42 is mounted to at least one of the seat bottom 26 and the seat back 28 for movement relative to the seat bottom 26 and the seat back 28 so that the article-drying system 30 can change between the storage configuration and the use configuration. The branch member 44 protrudes out of the space 32 formed in at least one of the seat bottom 26 and the seat back 28 to receive the article 34 in the use configuration. Each of the branch members 44 has a diameter or outer dimension that is sized to accommodate articles of varying sizes. The article-positioning system 38 is shown as being arranged within both the seat bottom 26 and the seat back 28. In other embodiments, the article-positioning system 38 may be arranged entirely within the seat bottom 26 or entirely within the seat back 28 as shown in FIGS. 7 and 8.

Figure 5:
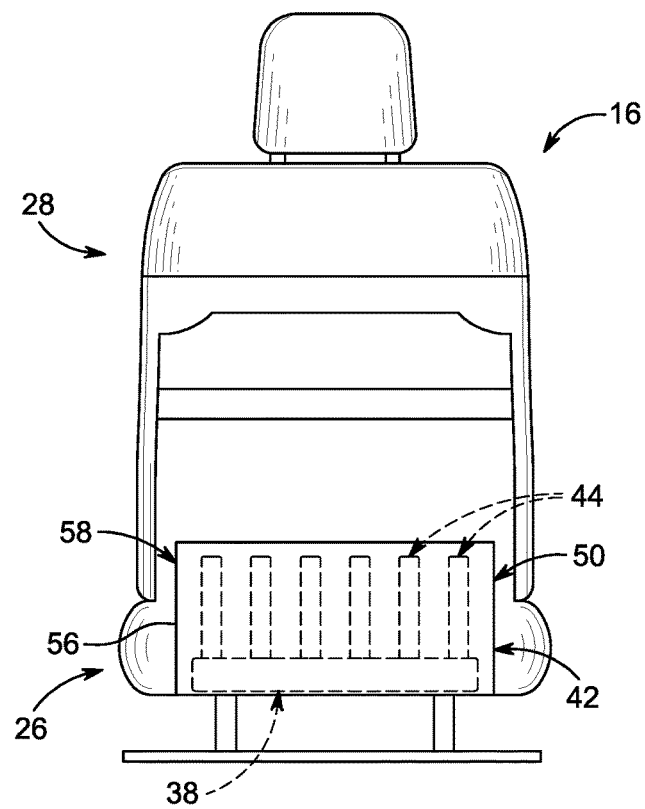
FIG. 5 is a rear elevation view of the occupant support and the article-drying system showing that the article-drying system includes a carrier member mounted to the occupant support and a plurality of branch members coupled to the carrier member to each receive corresponding articles for drying.
Figure 6:
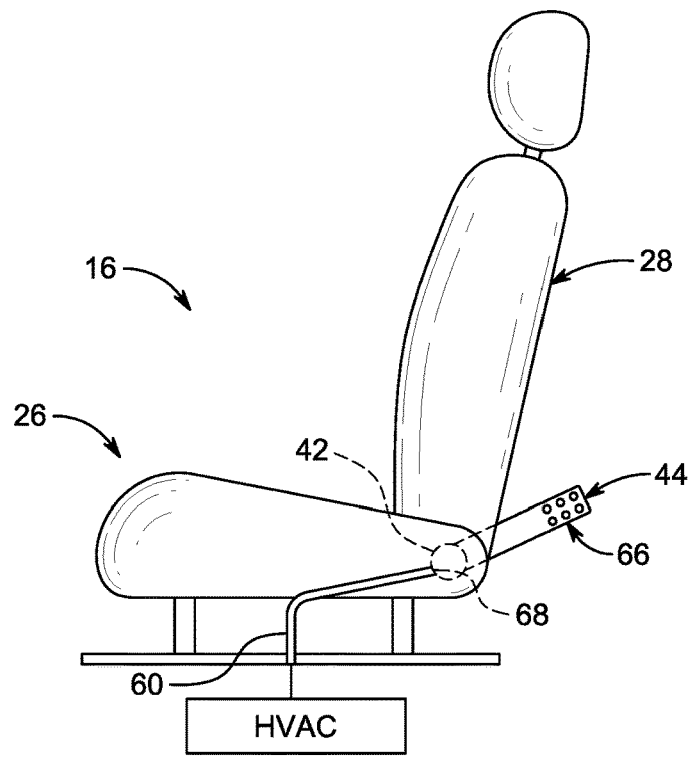
FIG. 6 is a side elevation view of an occupant support in accordance with the present disclosure showing another embodiment of an article-drying system that includes a carrier member and a branch member that are hollow and coupled to a source duct to receive a stream of drying fluid for flow through the carrier member, the branch member, and through openings in the branch member directly onto the article.

The carrier member 42 is illustratively embodied as a tubular member that extends horizontally through the space 32 formed in the occupant support 16 as shown in FIGS. 5 and 6. A plurality of branch members 44 extend vertically away from the carrier member 42 through the space 32. Each of the branch members 44 of the article-positioning system 38 protrudes into a rear-row occupant region 46 of vehicle 10 when the article-drying system 30 is in the use configuration as shown in FIG. 3. In the illustrative embodiment shown in FIG. 3, the stream of drying fluid 36 is discharged from a floor vent 48 of the vehicle 10. The floor vent 48 is located beneath the seat bottom 26 and opens toward the rear-row occupant region 46 so that the drying fluid 36 is discharged toward rear-row occupant region 46. The article-positioning system 38 aligns the article 34 with the stream of drying fluid 36 being discharged from the floor vent 48 to expedite drying of the article 34.

In some embodiments, the article-drying system 30 further includes a heating-system mount 50 and a heat-control system 52 (also called an airflow-control system 52) as shown in FIG. 4. The heating-system mount 50 is configured to mount the article-positioning system 38 to the occupant support 16 and, in some embodiments, may conceal the article-positioning system 38 from view in the storage configuration. The heat-control system 52 is configured to regulate heat transfer (e.g., the stream of drying fluid 36) to the article(s) in response to the arrangement of the article-positioning system 38 relative to the occupant support 16.

The heating-system mount 50 includes a housing 54 and an access door 56 as shown in FIG. 4. The housing 54 may be arranged in the space 32 to provide an interior region that houses the article-positioning system 38. In some embodiments, the housing 54 is an integral part of the occupant support 16. The housing 54 may define and provide the space 32 in the occupant support 16. An aperture 58 opens into the space 32 defined by the housing 54. The access door 56 extends across the aperture 58 opening into the space 32 to conceal the article-positioning system 38 when the article-drying system 30 is in the storage configuration. The access door 56 may be a rigid back panel of the occupant support or a flap of softer material such as cloth or leather. The access door 56 may be fastened to the occupant support 16 in an upright position to conceal the article-positioning system 38 by any suitable means such as by snaps, a zipper, hook-and-loop structures, or magnets.

The article-positioning system 38 may be fluidly coupled to the airflow-control system 52 to regulate application of the drying fluid 36 onto the article 34. The airflow-control system 52 may include a source duct 60, a valve 62, a blower 64, and a controller 65 as shown in FIG. 4. The source duct 60 may be coupled to a vehicle heating, ventilation, and air conditioning system (HVAC) to supply the stream of drying fluid 36 to the article-positioning system 38. The valve 62 is coupled to the source duct 60 to selectively admit or block the drying fluid therethrough. The blower 64 may be a part of the HVAC system of the vehicle 10 or may be located in the occupant support 16. The blower 64 is configured to displace and drive the drying fluid through the source duct 60 and/or the article-positioning system 38. The controller 65 may be coupled to the valve 62 and/or the blower to control the operation of the valve 62 and the blower 64 in response to a configuration of the article-drying system 30 and/or user inputs.

In some embodiments, the carrier member 42 and the branch members 44 of the article-positioning system 38 are formed as hollow ducts. The carrier member 42 is fluidly connected to the source duct 60 in the illustrative embodiment. The stream of drying fluid 36 is conducted through the source duct 60 and into the carrier member 42 when the article-drying system 30 is in the use configuration. From the carrier member 42, the stream of drying fluid 36 is distributed into each of the branch members 44. The stream of drying fluid 36 is eventually discharged through openings 66 formed in each of the branch members 44. The openings 66 are arranged on the branch members 44 so that drying fluid directly impinges on the article 34 once it is discharged from the openings 66.

The valve 62 may be configured to open and close the source duct 60 or the ducts defined by the branch members 44 depending on the configuration of the article-drying system 30. In the illustrative embodiment, the valve 62 is configured to open the source duct 60 when the article-drying system 30 is in the use configuration to discharge the drying fluid 36 onto the article. The valve 62 is configured to close the source duct 60 when the article-drying system 30 is in the storage configuration. The valve 62 may be a mechanical valve that opens the source duct 60 as the article-positioning system 38 pivots about the lateral axis 40 to change the article-drying system 30 from the storage configuration to the use configuration. Similarly, the valve 62 may be configured to close the source duct 60 as the article-positioning system 38 pivots about the axis 40 to change the article-drying system 30 from the use configuration to the storage configuration.

A plurality of valves 62 may be included in the article-drying system 30. An individual valve 62 may be coupled to each branch member 44 and may be controlled separately from one another to selectively open some of the branch members 44 while others of the branch members 44 remain closed. This could be used to control a flow rate of the drying fluid 36 through the branch members 44 by providing a higher flow rate as more valves 62 are closed to block flow through more branch members 44 and a lower flow rate as more valves 62 are opened to allow flow through more of the branch members 44.

In one example, the carrier member 42 is formed with an aperture 68 that is aligned with the source duct 60 in the use configuration to allow transfer of the drying fluid from the source duct 60 into the article-positioning system 38. The aperture 68 may be offset from the source duct 60 in the storage configuration to block transfer of the drying fluid out of the source duct 60. In this way, the source duct 60 and the carrier member 42 may cooperate to provide the valve 62.

In some embodiments, the valve 62 may be coupled to the controller 65 of the airflow-control system 52 as shown in FIG. 4. The controller 65 includes a microprocessor 70 and a memory storage device 72. The memory storage device 72 stores instructions that, when executed by the microprocessor 70, cause the valve 62 to automatically open or close in response to a sensed configuration and/or position of the article-drying system 30. For example, the controller 65 is configured to determine whether the article-drying system 30 is in the storage or use configuration and instruct the valve 62 to open and close the source duct 60 in response. As the article-positioning system 38 is pivoted about axis 40 to change the article-drying system 30 between the storage configuration and the use configuration, the controller 65 may output a command signal to the valve 62 to cause the valve 62 to open or close. In the illustrative embodiment, the valve 62 is opened in the use configuration and closed in the storage configuration.

The controller 65 may also be coupled to the blower 64, if included in the article-drying system 30, as shown in FIG. 4. The controller 65 outputs command signals to the blower 64 in response to a determination that the article-drying system 30 is in the storage configuration or the use configuration. The command signals cause the blower 64 to displace the drying fluid to the article-positioning system 38 when the article-drying system 30 is in the use configuration and cause the blower 64 to switch to a stand-by mode when the article-drying system 30 is in the storage configuration. In the stand-by mode, the blower 64 is off so that no drying fluid is provided to the article-positioning system 38. In the illustrative embodiment, the blower 64 may be arranged within the space 32 in the occupant support 16 as shown in FIG. 7.

The controller 65 may also be connected to a control panel or user interface 74 to receive user inputs 76 and output command signals in response to the user inputs 76 as suggested in FIG. 4. The user interface 74 may be coupled to a front dashboard, a center console, a door, an armrest, combinations thereof, or any other suitable component of the vehicle 10. An operator may input various fluid control inputs into the user interface to alter properties of the drying fluid being applied toward an article. The user inputs may include one or more of on and off functions, temperature control, flow rate, timers, and schedules, or any other suitable control function.

In some embodiments, the plurality of branch members 44 may be electric heaters configured to dry articles supported thereon. The plurality of branch members 44 may be electrically coupled to a wire harness (not shown) included in the occupant support 16 to receive power for providing the electric heat. In another example, the electric heat is radian heat. In another example, the electric heat is conductive heat provided, for example, by a heat mat coupled to each branch member 44. In yet another example, the branch members 44 may dry by evaporative, convective heat transfer.

In some embodiments, the present disclosure provides a place for the users such as an outdoorsman or a construction worker to dry gloves or hats in the vehicle. In illustrative embodiments, a flip out rack (i.e. article-positioning system 38) may be provided from the backside of the front seat (or front edge of the rear seat) to place gloves and hats (articles 34) to dry. The illustrative embodiments may provide a place other than the dash to place articles to dry. Some vehicles have an HVAC duct under the front seat that aims toward the rear seats. The drying rack may be located in such a way to take advantage of that heated air.

In some embodiments, articles are individually placed on rack so they can dry easier and faster. The articles may be secure and easy to see and grab when needed. The illustrative embodiments may take advantage of the rear seat HVAC for drying and may fold up and out of the way when not needed. In some embodiments, a blower in the seat back may be provided that blows ambient or heated air over the articles as shown in FIG. 7.

The illustrative embodiments are configured to hold articles 34 in place for drying so that they do not move or slide relative to the vehicle components 14. The illustrative embodiments also provide dedicated spaces to hold and dry articles. In some embodiments, the article drying system could be wired into the seat for getting power for heated fingers, such as branch members 44. The heat fingers may provide heat by conductive, convective, or radiant means.

The following numbered clauses include embodiments that are contemplated and non-limiting:

Clause 1. An occupant support comprising a seat bottom and a seat back coupled to the seat bottom.

Clause 2. The occupant support of clause 1, any other suitable clause, or any combination of suitable clauses, further comprising an article-drying system coupled to at least one of the seat bottom and the seat back.

Clause 3. The occupant support of clause 2, any other suitable clause, or any combination of suitable clauses, wherein the article-drying system is configured to move relative to the seat bottom and the seat back from a storage configuration, in which the article-drying system is stowed away in a space defined at least in part by at least one of the seat bottom and the seat back, and a use configuration, in which at least a portion of the article-drying system extends outwardly from the space formed in at least one of the seat bottom and the seat back to receive an article and to position the article in proximity to a stream of drying fluid to dry the article.

Clause 4. The occupant support of clause 3, any other suitable clause, or any combination of suitable clauses, wherein the article-drying system includes an article-positioning system that is configured to pivot about an axis to change the article-drying system from the storage configuration to the use configuration.

Clause 5. The occupant support of clause 4, any other suitable clause, or any combination of suitable clauses, wherein the article-positioning system includes a carrier member mounted to at least one of the seat bottom and the seat back for movement relative to the seat bottom and the seat back so that the article-drying system can change between the storage configuration and the use configuration, and a branch member that extends outwardly from the carrier member and protrudes out of the space formed in at least one of the seat bottom and the seat back to receive the article in the use configuration.

Clause 6. The occupant support of clause 5, any other suitable clause, or any combination of suitable clauses, wherein the branch member of the article-drying system protrudes into a rear-row occupant region of a vehicle when the article-drying system is in the use configuration.

Clause 7. The occupant support of clause 6, any other suitable clause, or any combination of suitable clauses, wherein the stream of drying fluid is provided by a vent arranged beneath the seat bottom of the occupant support, the vent being arranged to discharge the stream of drying fluid toward the rear-row occupant region.

Clause 8. The occupant support of clause 7, any other suitable clause, or any combination of suitable clauses, wherein the branch member is arranged to align the article with the stream of drying fluid being from beneath the seat bottom into the rear-row occupant region.

Clause 9. The occupant support of clause 5, any other suitable clause, or any combination of suitable clauses, wherein the carrier member and the branch member are formed as hollow ducts and are fluidly connected to a source duct to deliver the stream of drying fluid to the article.

Clause 10. The occupant support of clause 4, any other suitable clause, or any combination of suitable clauses, wherein the article-drying system further includes a heating-system mount configured to mount the article-positioning system to at least one of the seat bottom and the seat back and conceal the article-positioning system from view within the space.

Clause 11. The occupant support of clause 10, any other suitable clause, or any combination of suitable clauses, wherein the heating-system mount includes a housing arranged in the space to provide an interior region that houses the article-positioning system and an access door that extends across an aperture that opens into the space to conceal the article positioning system when the article-drying system is in the storage configuration.

Clause 12. The occupant support of clause 4, any other suitable clause, or any combination of suitable clauses, wherein the article-drying system further includes an airflow-control system having a source duct coupled to an air source to provide the drying fluid and a valve coupled to the source duct, and wherein the valve is configured to open when the article-drying system is in the use configuration to discharge the drying fluid onto the article and the valve is configured to close when the article-drying system is in the storage configuration.

Clause 13. The occupant support of clause 12, any other suitable clause, or any combination of suitable clauses, wherein the airflow-control system further includes a controller configured to open and close the valve to admit or block airflow through the source duct in response to a determination that the article-drying system is in the storage configuration or the use configuration.

Clause 14. The occupant support of clause 3, any other suitable clause, or any combination of suitable clauses, further comprising a blower arranged in the space to provide the stream of drying fluid when the article-drying system is in the use configuration.

Clause 15. An occupant support comprising a seat bottom a seat back coupled to the seat bottom.

Clause 16. The occupant support of clause 15, any other suitable clause, or any combination of suitable clauses, further comprising an article-drying system coupled to the seat bottom.

Clause 17. The occupant support of clause 16, any other suitable clause, or any combination of suitable clauses, wherein the article-drying system includes a carrier member mounted to the seat bottom and at least one branch member coupled to the carrier member and arranged to extend outwardly away from the carrier member.

Clause 18. The occupant support of clause 17, any other suitable clause, or any combination of suitable clauses, wherein the carrier member and the branch member are mounted to the seat bottom for pivotable movement about a pivot axis between a stowed position, in which the carrier member and the branch member are stored against the seat bottom, and a use position in which the branch member extends away from the seat bottom and is configured to receive an article to hold the article to be dried.

Clause 19. The occupant support of clause 18, any other suitable clause, or any combination of suitable clauses, wherein the carrier member and the branch member are formed as hollow ducts and are fluidly connected to a source duct to deliver the stream of drying fluid to the article.

Clause 20. The occupant support of clause 18, any other suitable clause, or any combination of suitable clauses, wherein the article-drying system further includes a heating-system mount having a housing arranged in a space formed in the seat bottom to provide an interior region that houses the article-positioning system and an access door that extends across an aperture that opens into the space to conceal the article positioning system when the article-drying system is in the storage configuration.

Clause 21. The occupant support of clause 20, any other suitable clause, or any combination of suitable clauses, wherein the article-drying system further includes an airflow-control system having a source duct coupled to an air source to provide the drying fluid and a valve coupled to the source duct, and wherein the valve is configured to open when the article-drying system is in the use configuration to discharge the drying fluid onto the article and the valve is configured to close when the article-drying system is in the storage configuration.

Clause 22. The occupant support of clause 18, any other suitable clause, or any combination of suitable clauses, further comprising a blower arranged in one of the seat bottom or the seat back to provide the stream of drying fluid when the article-drying system is in the use configuration.

Clause 23. An occupant support comprising a seat bottom, a seat back coupled to the seat bottom, and an article-drying system.

Clause 24. The occupant support of clause 23, any other suitable clause, or any combination of suitable clauses, wherein the article-drying system is coupled to the seat back.

Clause 25. The occupant support of clause 24, any other suitable clause, or any combination of suitable clauses, wherein the article-drying system includes a carrier member mounted to the seat back and at least one branch member coupled to the carrier member and arranged to extend outwardly away from the carrier member.

Clause 26. The occupant support of clause 25, any other suitable clause, or any combination of suitable clauses, wherein the carrier member and the at least one branch member are mounted to the seat back for pivotable movement about a pivot axis between a stowed position, in which the carrier member and the at least one branch member are stored against the seat back, and a use position in which the at least one branch member extends away from the seat back and is configured to receive an article to hold the article to be dried.

Clause 27. The occupant support of clause 26, any other suitable clause, or any combination of suitable clauses, wherein the carrier member and the at least one branch member are formed as hollow ducts and are fluidly connected to a source duct to deliver a stream of drying fluid to the article, the article-drying system further includes a heating-system mount having a housing arranged in a space formed in the seat bottom to provide an interior region that houses the article-positioning system and an access door that extends across an aperture that opens into the space to conceal the article positioning system when the article-drying system is in the storage configuration, and the article-drying system further includes an airflow-control system having a source duct coupled to an air source to provide a stream of drying fluid and a valve coupled to the source duct, and wherein the valve is configured to open when the article-drying system is in the use configuration to discharge the drying fluid onto the article and the valve is configured to close when the article-drying system is in the storage configuration.

Clause 28. The occupant support of clause 26, any other suitable clause, or any combination of suitable clauses, wherein the at least one branch member transfers heat to the article by conductive heat transfer.

The invention claimed is:

1. An occupant support comprising
a seat bottom,
a seat back coupled to the seat bottom, and
an article-drying system coupled to at least one of the seat bottom and the seat back and configured to move relative to the seat bottom and the seat back from a storage configuration, in which the article-drying system is stowed away in a space defined at least in part by at least one of the seat bottom and the seat back, and a use configuration, in which at least a portion of the article-drying system extends outwardly from the space formed in at least one of the seat bottom and the seat back to receive an article and to position the article in proximity to a stream of drying fluid to dry the article.

2. The occupant support of claim 1, wherein the article-drying system includes an article-positioning system that is configured to pivot about an axis to change the article-drying system from the storage configuration to the use configuration.

3. The occupant support of claim 2, wherein the article-positioning system includes a carrier member mounted to at least one of the seat bottom and the seat back for movement relative to the seat bottom and the seat back so that the article-drying system can change between the storage configuration and the use configuration, and a branch member that extends outwardly from the carrier member and protrudes out of the space formed in at least one of the seat bottom and the seat back to receive the article in the use configuration.

4. The occupant support of claim 3, wherein the branch member of the article-drying system protrudes into a rear-row occupant region of a vehicle when the article-drying system is in the use configuration.

5. The occupant support of claim 4, wherein the stream of drying fluid is provided by a vent arranged beneath the seat bottom of the occupant support, the vent being arranged to discharge the stream of drying fluid toward the rear-row occupant region.

6. The occupant support of claim 5, wherein the branch member is arranged to align the article with the stream of drying fluid being from beneath the seat bottom into the rear-row occupant region.

7. The occupant support of claim 3, wherein the carrier member and the branch member are formed as hollow ducts and are fluidly connected to a source duct to deliver the stream of drying fluid to the article.

8. The occupant support of claim 2, wherein the article-drying system further includes a heating-system mount configured to mount the article-positioning system to at least one of the seat bottom and the seat back and conceal the article-positioning system from view within the space.

9. The occupant support of claim 8, wherein the heating-system mount includes a housing arranged in the space to provide an interior region that houses the article-positioning system and an access door that extends across an aperture that opens into the space to conceal the article positioning system when the article-drying system is in the storage configuration.

10. The occupant support of claim 2, wherein the article-drying system further includes an airflow-control system having a source duct coupled to an air source to provide the stream of drying fluid and a valve coupled to the source duct, and wherein the valve is configured to open when the article-drying system is in the use configuration to discharge the stream of drying fluid onto the article and the valve is configured to close when the article-drying system is in the storage configuration.

11. The occupant support of claim 10, wherein the airflow-control system further includes a controller configured to open and close the valve to admit or block airflow through the source duct in response to a determination that the article-drying system is in the storage configuration or the use configuration.

12. The occupant support of claim 1, further comprising a blower arranged in the space to provide the stream of drying fluid when the article-drying system is in the use configuration.

13. An occupant support comprising
a seat bottom, a seat back coupled to the seat bottom, and
an article-drying system coupled to the seat bottom, the article-drying system including a carrier member mounted to the seat bottom and at least one branch member coupled to the carrier member and arranged to extend outwardly away from the carrier member,
wherein the carrier member and the at least one branch member are mounted to the seat bottom for pivotable movement about a pivot axis between a stowed position, in which the carrier member and the at least one branch member are stored against the seat bottom, and a use position in which the at least one branch member extends away from the seat bottom and is configured to receive an article to hold the article to be dried, and
wherein the carrier member and the at least one branch member are formed as hollow ducts and are fluidly connected to a source duct to deliver a stream of drying fluid to the article.

14. The occupant support of claim 13, wherein the article-drying system further includes a heating-system mount having a housing arranged in a space formed in the seat bottom to provide an interior region that houses the carrier member and the at least one branch member and an access door that extends across an aperture that opens into the space to conceal the carrier member and the at least one branch member when the article-drying system is in the stowed position.

15. The occupant support of claim 14, wherein the article-drying system further includes an airflow-control system having a source duct coupled to an air source to provide the stream of drying fluid and a valve coupled to the source duct, and wherein the valve is configured to open when the article-drying system is in the use position to discharge the stream of drying fluid onto the article and the valve is configured to close when the article-drying system is in the stowed position.

16. The occupant support of claim 13, further comprising a blower arranged in one of the seat bottom or the seat back to provide the stream of drying fluid when the article-drying system is in the use position.

17. The occupant support of claim 13, wherein the at least one branch member of the article-drying system protrudes into a rear-row occupant region of a vehicle when the article-drying system is in the use position.

18. An occupant support comprising
a seat bottom,
a seat back coupled to the seat bottom, and
an article-drying system coupled to the seat back, the article-drying system including a carrier member mounted to the seat back and at least one branch member coupled to the carrier member and arranged to extend outwardly away from the carrier member,
wherein the carrier member and the at least one branch member are mounted to the seat back for pivotable movement about a pivot axis between a stowed position, in which the carrier member and the at least one branch member are stored against the seat back, and a use position in which the at least one branch member extends away from the seat back and is configured to receive an article to hold the article to be dried, and
wherein the carrier member and the at least one branch member are formed as hollow ducts and are fluidly connected to a source duct to deliver a stream of drying fluid to the article, the article-drying system further includes a heating-system mount having a housing arranged in a space formed in the seat bottom to provide an interior region that houses the carrier member and the at least one branch member and an access door that extends across an aperture that opens into the space to conceal the carrier member and the at least one branch member when the article-drying system is in the stowed position, and
wherein the article-drying system further includes an airflow-control system having a source duct coupled to an air source to provide the stream of drying fluid and a valve coupled to the source duct, and wherein the valve is configured to open when the article-drying system is in the use position to discharge the stream of drying fluid onto the article and the valve is configured to close when the article-drying system is in the stowed position.

19. The occupant support of claim 18, wherein the at least one branch member transfers heat to the article by conductive heat transfer.

20. The occupant support of claim 18, wherein the airflow-control system further includes a controller configured to open and close the valve to admit or block airflow through the source duct in response in response to a determination that the article drying system is in the stowed position or the use position.

* * * * *